(No Model.)
J. G. SCHILLER.
PNEUMATIC TIRE.
No. 588,018.  Patented Aug. 10, 1897.
FIG. 1.
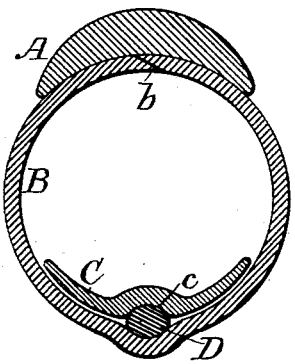
FIG. 2.  FIG. 3.
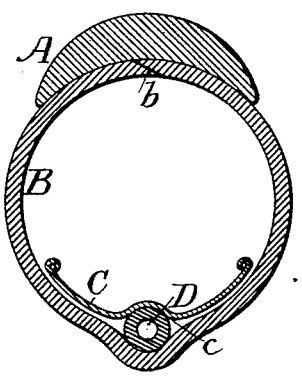 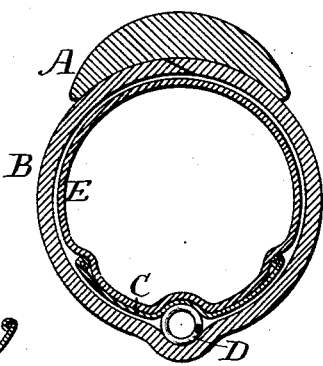
FIG. 6.
FIG. 4.  FIG. 5.
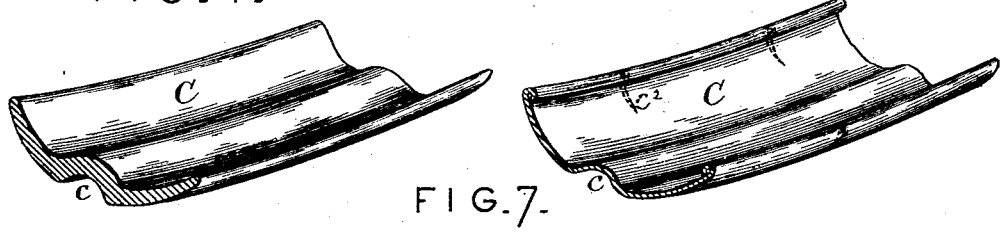
FIG. 7.
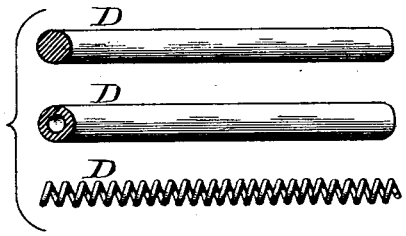
WITNESSES
Harry L. Ames
A. B. Digges
INVENTOR
John G. Schiller.
by E. E. Masson, Attorney.

UNITED STATES PATENT OFFICE.

JOHN G. SCHILLER, OF WASHINGTON, DISTRICT OF COLUMBIA.

PNEUMATIC TIRE.

SPECIFICATION forming part of Letters Patent No. 588,018, dated August 10, 1897.

Application filed July 17, 1896. Serial No. 599,547. (No model.)

*To all whom it may concern:*

Be it known that I, JOHN G. SCHILLER, a citizen of the United States, residing at Washington, in the District of Columbia, have invented certain new and useful Improvements in Pneumatic Tires, of which the following is a specification, reference being had therein to the accompanying drawings.

This invention relates to means for preventing pneumatic tires from being materially flattened when punctured and also to prevent the puncturing of said tire; and the objects of my invention are to provide with the rubber tube of a tire a simple, inexpensive, and light annular support located within said tube, said support having a peripheral groove and an endless cushion within said groove to support said rubber-tube tire and to prevent said tube from becoming materially flattened when punctured and also to prevent the puncturing of said rubber tube or the loss of the greater part of its elasticity on account of the escape of air therefrom. I attain these objects by the construction illustrated in the accompanying drawings, in which—

Figure 1 is a transverse section of a tubular rubber tire provided therein with an annular support, of wood or papier-mâché, having a peripheral groove and an endless cushion within said groove and constructed in accordance with my invention. Fig. 2 is a transverse section of a tubular rubber tire provided therein with an annular support of sheet metal grooved and encircled with a cushion, as above stated. Fig. 3 is a transverse section of a tubular rubber tire provided therein with an annular support of sheet metal grooved and cushioned as in Fig. 2, but with an addition of an annular rubber chamber therein. Fig. 4 is a perspective view of a portion of the annular support as made of wood or papier-mâché. Fig. 5 is a perspective view of a portion of the annular support as made of sheet metal. Fig. 6 is a transverse section of the sheet-metal annular support provided with a peripheral groove large enough to receive two annular cushions shown therein. Fig. 7 is a side view of portions of three equivalent forms of cushions.

The objections to the flattening of pneumatic tires on account of punctures or not sufficient inflation are well known, as when in that condition the rider is seemingly climbing hills on account of the bulging of the tire in front of the flattened portion, besides the danger of cutting the tire by the felly of the wheel pressing thereon. These objections are intended to be obviated by my construction.

In the accompanying drawings, A represents the ordinary wood felly of a bicycle-wheel; B, a hollow rubber tire of suitable construction for strength to normally remain inflated and to travel upon the ground.

C represents an annular support for the tire and located within the tire B to support its peripheral portion, but not attached thereto. Said support C has its sides inwardly bent, so that said sides substantially conform to the interior surface of the rubber tire B, but the central portion of its periphery is arched inwardly to constitute a peripheral groove $c$, within which is placed an annular or endless cushion D, the outer periphery of which bears against the inner surface of the rubber tire B. This cushion D normally prevents the sides of the support C from bearing against the walls of the tire B. The ridge formed in the material of the tire-support C over the groove $c$ adds to the stiffness of the tire-support, so thus if made of sheet metal it may be very thin and yet possess great strength and stiffness. Said metal may be copper, brass, aluminium, tinned iron, or steel, and to facilitate the bending of the metal into a ring its edges may have notches cut therein, as shown by dotted lines $c^2$ in Fig. 5. The tire-support C can also be made thicker, as in Figs. 1 and 4, of light material, as wood, papier-mâché, rawhide, and other well-known substances.

The tire-support C and its encircling cushion D can be introduced within the tire B before the edges of said tire are brought together and connected, as at $b$.

Although the walls of the tire are generally made of a single thickness, as shown in Figs. 1 and 2, on account of the small expense of production, if it is desired to obtain a tire entirely puncture-proof a supplemental annular air-chamber E, Fig. 3, is also placed within the tire B between the portion of the wall having the smaller periphery and the support C, and an inflating valved nozzle connected with said chamber E, as usual.

The annular cushion D is preferably made of a cylindrical band of elastic india-rubber, either solid, as shown in Fig. 1, or tubular, as shown in Fig. 2. It may also be in the form of a metal coil-spring, as shown in the bottom of Fig. 7.

Although only one annular cushion D is generally used within the groove c of the tire-support C, said groove may be made wider, as in Fig. 6, and two cushions D placed side by side in said groove; and although rubber is preferred as material for the cushion D it may be made of hemp or Manila fiber spun in strands and twisted together as a rope.

I am aware that tubular rubber tires have been provided with a tire-supporter consisting of a flat ring of metal and a segmental cushion of hard or soft rubber interposed between said ring and the tire and wholly covering the periphery of said ring. I am also aware that the thread portion of the rubber tires has been surrounded by a metal ring having its inner face concave and its outer face grooved to receive and retain an annular wearing cushion or tire. I am also aware that a pneumatic tire unsupported internally has been provided on its periphery with metal coiled springs and the latter retained by a jacket laced around them and nearly inclosing the pneumatic tire and do not claim said constructions, as they materially differ from my invention.

Having now fully described my invention, I claim—

1. In combination with a wheel-felly, a rubber-tube tire, and within said tire adjacent to its bearing portion an annular tire-support C having its sides curved approximately parallel with the walls of the tire and its outer periphery grooved centrally, and an endless elastic cushion partly within the groove of the tire-support, substantially as described.

2. The combination of a rubber-tube tire and within it adjacent to its bearing portion an annular tire-support C having its outer periphery grooved centrally, an endless cushion partly within the outer groove of the tire-support, and a supplemental annular air-chamber E within the tire between its walls and the tire-support C, the latter having its periphery grooved, substantially as described.

In testimony whereof I affix my signature in presence of two witnesses.

JOHN G. SCHILLER.

Witnesses:
   E. E. MASSON,
   A. B. DEGGES.